(12) United States Patent
Kurth

(10) Patent No.: US 7,461,850 B2
(45) Date of Patent: Dec. 9, 2008

(54) UNDERRIDE PROTECTION DEVICE FOR PASSENGER VEHICLES FOR PLACEMENT BELOW LONGITUDINAL CHASSIS BEAMS AND IN FRONT OF A SUB-FRAME OR CROSS MEMBER AS AN ADDITIONAL CRASH PLANE

(75) Inventor: Andreas Kurth, Braunschweig (DE)

(73) Assignee: Volkswagen AG, Wolfsburg (DE)

( * ) Notice: Subject to any disclaimer, the term of this patent is extended or adjusted under 35 U.S.C. 154(b) by 553 days.

(21) Appl. No.: 11/146,258

(22) Filed: Jun. 6, 2005

(65) Prior Publication Data

US 2005/0275182 A1 Dec. 15, 2005

(30) Foreign Application Priority Data

Jun. 9, 2004 (DE) .................... 10 2004 028 161

(51) Int. Cl.
*B62D 21/11* (2006.01)
(52) U.S. Cl. .............................................. 280/124.109
(58) Field of Classification Search .......... 280/124.109, 280/781, 785; 180/311, 312
See application file for complete search history.

(56) References Cited

U.S. PATENT DOCUMENTS 2,627,426 A * 2/1953 Toneray et al. .............. 280/781
2,669,462 A * 2/1954 Toncray et al. .............. 280/785
3,110,518 A * 11/1963 Wessells ...................... 296/204
5,988,734 A * 11/1999 Longo et al. ........... 296/203.01

FOREIGN PATENT DOCUMENTS

| DE | 199 43 773 A1 | 3/2001 |
| DE | 100 57 566 A1 | 5/2002 |

\* cited by examiner

*Primary Examiner*—Faye M. Fleming

(57) ABSTRACT

An underride protection device for passenger vehicles, in particular all-terrain vehicles, which is placed below longitudinal chassis beams and in front of a sub-frame or cross member as an additional crash plane, includes a two-dimensionally extensive element delimiting the vehicle towards the ground, at least one member extending in a transverse direction of the vehicle and two lateral members extending in a lengthwise direction of the vehicle, first coupling elements for connecting interior portions of the two-dimensionally extensive element to the sub-frame or cross member, and second coupling elements for rigidly connecting exterior portions of the two-dimensionally extensive element to the longitudinal chassis beams. In vehicles whose longitudinal chassis beams are arranged at a high level, the underride protection device with its integrated crash beam provides a compatibility of the impact zones for protecting the occupants of a struck vehicle.

17 Claims, 3 Drawing Sheets

UNDERRIDE PROTECTION DEVICE FOR PASSENGER VEHICLES FOR PLACEMENT BELOW LONGITUDINAL CHASSIS BEAMS AND IN FRONT OF A SUB-FRAME OR CROSS MEMBER AS AN ADDITIONAL CRASH PLANE

BACKGROUND OF THE INVENTION

Field of the Invention

This invention relates to an underride protection device for passenger vehicles. The underride protection device is disposed below longitudinal chassis beams and in front of a sub-frame or cross member as an additional crash plane.

The principle of protecting other road users from injury in the case of a collision through the use of an underride protection device is generally known from the field of commercial vehicles. The same idea is of interest in passenger vehicles such as all-terrain vehicles with longitudinal chassis beams disposed relatively high above the road surface. The devices known from the field of commercial vehicles, however, are not suitable for passenger vehicles due to limited space.

In order to avoid excessive impact forces in a collision with another vehicle, the impact zones of the colliding vehicles as well as their elements for crash energy absorption, which are mounted behind these zones must be disposed at about the same level. In conventional vehicles the impact zones are usually located at the same level as the longitudinal chassis beams. If the latter are arranged at a higher level compared to the impact zone, a crash plane whose impact properties correspond approximately to those of the longitudinal chassis beam plane must be provided below the longitudinal chassis beams in order to maintain compatibility.

A crash element that is located below the longitudinal chassis beams is disclosed for example in Published, Non-Prosecuted German Patent Application No. DE 199 43 773 A1. The crash element described therein includes a plate mounted to two longitudinal chassis beams and is used primarily as an addition to the first crash plane in order to improve crash safety especially in compact vehicles with short front ends. The interior ends of the longitudinal chassis beams are connected to a sub-frame or cross member and the free exterior ends can be connected by a transverse member. Additional paneling reaching up to the longitudinal chassis beams makes it possible to largely enclose for example the engine compartment towards the ground. When with this construction the distance between the crash element and the longitudinal chassis beams becomes too large, the crash element may under certain circumstances deflect downwards when the longitudinal chassis beams are underridden.

Crash elements that are located below the longitudinal chassis beams are furthermore disclosed in Published, Non-Prosecuted German Patent Application No. DE 100 57 566 A1. Here the crash elements are configured as tube sections, which extend below the longitudinal chassis beams and are arranged in a lengthwise direction of the vehicle, between a sub-frame or cross member and a front end which is attached to the longitudinal chassis beams. However, there is no cross connection between the tube sections and no paneling towards the ground is provided, and thus there is no underride protection.

SUMMARY OF THE INVENTION

It is accordingly an object of the invention to provide an underride protection device which overcomes the above-mentioned disadvantages of the heretofore-known devices of this general type and which is suitable for passenger vehicles and which, even in vehicles with longitudinal chassis beams disposed at a high level, provides compatibility of the impact zones for protecting the occupants of a struck vehicle.

With the foregoing and other objects in view there is provided, in accordance with the invention, in combination with a passenger vehicle having longitudinal chassis beams defining a vehicle longitudinal direction and having a support structure selected from the group of a sub-frame and a cross member, an underride protection device, including:

a substantially two-dimensionally extensive element delimiting the passenger vehicle towards a bottom side of the passenger vehicle, the substantially two-dimensionally extensive element having inner portions and outer portions, the inner portions being disposed closer to the support structure than the outer portions;

a transverse member extending in a vehicle transverse direction;

two lateral members extending in the vehicle longitudinal direction;

the transverse member, the two lateral members, and the substantially two-dimensionally extensive element being disposed below the longitudinal chassis beams in front of the support structure such that the transverse member, the two lateral members, and the substantially two-dimensionally extensive element define a crash plane below the longitudinal chassis beams;

first coupling elements connecting the inner portions of the substantially two-dimensionally extensive element to the support structure; and second coupling elements fixedly connecting the outer portions of the substantially two-dimensionally extensive element to the longitudinal chassis beams.

In other words, according to the invention, there is provided an underride protection device for passenger vehicles to be provided below longitudinal chassis beams and in front of a sub-frame or cross member as an additional crash plane, including:

a two-dimensionally extensive element delimiting the vehicle towards the ground and having at least one member extending in a transverse direction of the vehicle and two lateral members extending in a lengthwise direction of the vehicle;

first coupling devices for connecting interior portions of the two-dimensionally extensive element to the sub-frame or cross member; and second coupling devices for rigidly connecting exterior portions of the two-dimensionally extensive element to the longitudinal chassis beams.

Even in vehicles with longitudinal chassis beams arranged at a high level, in particular all-terrain vehicles and the like, the underride protection device with an integrated crash beam according to this invention ensures a compatibility protecting the occupants of different types of vehicles struck in a collision. First and second coupling elements as well as reinforcement via reinforcement sections or reinforcement profiles can prevent the two-dimensionally extensive element from deflecting or bending downwards. It functions thus both as an underride protection device and as a crash element.

Another advantage of the solution according to the invention is the possibility of mounting the underride protection device during assembly solely in selected vehicles. This makes sense especially when vehicles of different floor levels are manufactured on one production platform. In this case an underride protection device can be mounted solely in vehicle types with longitudinal chassis beams arranged at a high level in order to meet the compatibility requirements.

Furthermore, in the case of only slight damage, there are advantages as compared to solid sub-frames with regard to repairs, as the underride protection device can be demounted easily from the sub-frame or cross member.

According to a first preferred embodiment of the invention the two-dimensionally extensive element is configured as a shell construction. This is a space-saving way of integrating the members or profiles into the outer shell of the vehicle. They are preferably arranged in such a fashion that the bottom sides of the members are disposed at the bottom boundary.

For this purpose the two-dimensionally extensive element can have a mounting plate to connect the members in transverse and longitudinal directions. These members can be directly connected via the mounting plate.

In particular, it is possible to form the members by shell members, which are mounted to the interior of the mounting plate.

According to a further preferred embodiment, individual members or all of them are configured as sections or profiles, which are produced by hydroforming or roll forming processes. A mounting plate incorporating further members where required is attached to these sections from below.

Here again, the mounting plate can provide a connection between the members. However, it is also possible to at first interconnect the members in transverse and longitudinal directions. This can be done either directly or through the use of connector members or node elements.

According to a further preferred embodiment of the invention, the interior portions of the two-dimensionally extensive element are flexibly connected to the sub-frame or front cross member. In this fashion rocking of the underride protection device can be avoided. Furthermore, this flexible connection can prevent damage to the sub-frame or hub support in the case of light forces acting on the underride protection device, for example when the vehicle is hit by another vehicle pulling into a parking space. In the case of a serious collision, however, this flexible connection can ensure a defined support of the underride protection device in a lengthwise direction of the vehicle in order to absorb the crash energy by controlled deformation.

For the purpose of an elastic connection of the underride protection device, the first coupling elements include rubber flexible bearings. These are provided or mounted for example at the sub-frame or cross member.

Furthermore brackets can be provided at or mounted to the two-dimensionally extensive element; each of them is received in a rubber flexible bearing arranged at the sub-frame or cross member.

Preferably the rotational axis of these rubber flexible bearings extends substantially in a lengthwise direction of the vehicle.

Alternatively, the two-dimensionally extensive element can also be attached to the sub-frame or cross member in a substantially inflexible connection. A threaded connection or the like makes selective demounting of the underride protection device possible.

According to a further preferred embodiment of the invention, the second coupling elements include substantially vertically extending front plates. These front plates bridge the gap between the longitudinal chassis beams and the two-dimensionally extensive element in order to counter a possible downward deflection of the two-dimensionally extensive element. The front plates can either be incorporated in the two-dimensionally extensive element or be provided in the form of separate mounting elements.

In order to optimize the support of the two-dimensionally extensive element in a lengthwise direction of the vehicle in the case of a collision, deflectors can be provided on the longitudinal members according to a further preferred embodiment of the invention, each deflector being located in front of a transverse suspension arm in a lengthwise direction of the vehicle. In this fashion, the deformation capacity of the transverse suspension arms can additionally be used to absorb crash energy. Furthermore, the area of support is expanded in a transverse direction of the vehicle.

With the objects of the invention in view there is also provided a passenger vehicle, including:

longitudinal chassis beams extending in a vehicle longitudinal direction and defining a first crash plane;

a support structure selected from the group of a sub-frame and a cross member;

an underride protection device disposed below the longitudinal chassis beams in front of the support structure;

the underride protection device including a substantially two-dimensionally extensive element, a transverse member, two lateral members, first coupling elements, and second coupling elements;

the substantially two-dimensionally extensive element delimiting the passenger vehicle towards a bottom side of the passenger vehicle, the substantially two-dimensionally extensive element having inner portions and outer portions, the inner portions being disposed closer to the support structure than the outer portions;

the first coupling elements connecting the inner portions of the substantially two-dimensionally extensive element to the support structure;

the second coupling elements fixedly connecting the outer portions of the substantially two-dimensionally extensive element to the longitudinal chassis beams;

the lateral members extending in the vehicle longitudinal direction, the transverse member extending in a vehicle transverse direction; and the transverse member, the two lateral members, and the substantially two-dimensionally extensive element defining a second crash plane below the longitudinal chassis beams.

According to another feature of the invention, the substantially two-dimensionally extensive element is a shell construction.

According to yet another feature of the invention, the substantially two-dimensionally extensive element has a mounting plate connecting the transverse member and the two lateral members to one another.

According to a further feature of the invention, the transverse member and the two lateral members are shell elements placed on an interior side of the mounting plate.

According to another feature of the invention, the transverse member and/or the longitudinal members are a hydroformed members or roll-formed members; and the substantially two-dimensionally extensive element has a mounting plate attached to a bottom side of the transverse member and the longitudinal members.

According to a further feature of the invention, the first coupling elements are configured to flexibly connect the inner portions of the substantially two-dimensionally extensive element to the support structure.

According to another feature of the invention, the first coupling elements include rubber flexible bearings.

According to yet another feature of the invention, the first coupling elements further include brackets provided at the substantially two-dimensionally extensive element; and the brackets are respectively supported by the rubber flexible bearings at the support structure.

According to a further feature of the invention, the first coupling elements include brackets mounted to the substantially two-dimensionally extensive element.

According to another feature of the invention, the first coupling elements include brackets provided at the substantially two-dimensionally extensive element and the brackets are flexibly supported on the support structure.

According to yet another feature of the invention, the rubber-flexible bearings define respective rotational axes extending substantially parallel to the vehicle longitudinal direction.

According to another feature of the invention, the second coupling elements include front plates extending substantially vertically and bridging a spacing distance between the longitudinal chassis beams and the substantially two-dimensionally extensive element.

According to an additional feature of the invention, transverse suspension arms are connected to the support structure; and deflectors are placed on the two lateral members such that the deflectors are provided, with respect to the vehicle longitudinal direction, in front of the transverse suspension arms.

According to another feature of the invention, the substantially two-dimensionally extensive element is rigidly connected to the support structure.

According to a further feature of the invention, the substantially two-dimensionally extensive element, the transverse member, the lateral members, the first coupling elements, and the second coupling elements are configured to be mounted in an all-terrain passenger vehicle.

Other features which are considered as characteristic for the invention are set forth in the appended claims.

Although the invention is illustrated and described herein as embodied in an underride protection device for passenger vehicles that is provided below longitudinal chassis beams and in front of a sub-frame or cross member as an additional crash plane, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
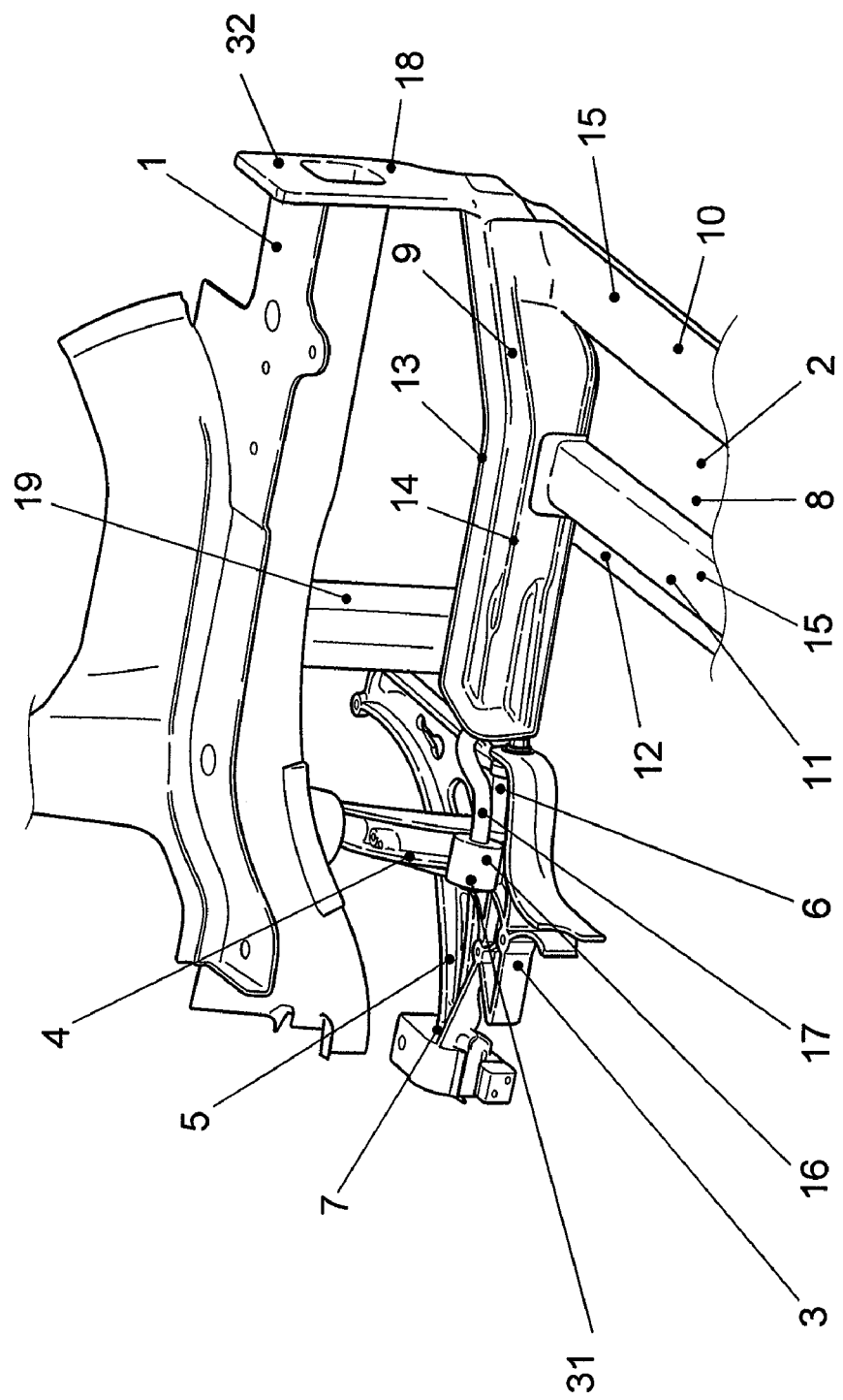
FIG. 1 is a partial perspective view of a first embodiment of a mounted underride protection device according to the invention.

Referring now to the figures of the drawings in detail and first, particularly, to FIG. 1 thereof, there is shown a partial perspective view of a first embodiment of a front end of an all-terrain passenger vehicle. The longitudinal chassis beams 1 of the vehicle are arranged at a relatively high level and define a first crash plane. For reasons of compatibility a second crash plane including an underride protection device 2 with a crash profile or crash beam is provided below the level of the first crash plane. In the following, the underride protection device is described with reference to a front end of a vehicle. However, the underride protection device can correspondingly also be provided at the rear end of a vehicle.

The underride protection device 2 of the embodiment shown here is arranged in a lengthwise direction of the vehicle in front of a sub-frame or front cross member 3, which in turn is mounted to the body of the vehicle and through the use of webs 4 to the bottom side of the longitudinal chassis beams 1. On both ends of the cross member 3 a wheel-locating transverse suspension arm or transverse control arm 5 is provided which is pivoted through the use of a bearing bushing 6 to the front cross member 3 and through the use of a bearing pin 7 to the body of the vehicle. The pivot axis extends substantially in a lengthwise direction of the vehicle.

The underride protection device 2 according to the first embodiment includes a sheet-shaped or substantially two-dimensionally extensive element 8 delimiting the engine compartment of the vehicle towards the ground. This substantially two-dimensionally extensive element 8 exhibits a profiling both in a transverse and in a longitudinal direction of the vehicle. As shown in FIG. 1, two transverse members or profiles 10 and 11 are arranged between two lateral longitudinal members 9. The lateral longitudinal members 9 extend substantially below the front portions of the longitudinal chassis beams 1, from the front end of the vehicle to the front of the front cross member 3. The number of transverse members is determined depending on the desired energy absorption capacity. In any case, however, at least one transverse member 10 is provided at the front end of the vehicle, interconnecting the front end portions of the longitudinal members 9.

In the first embodiment, the members or profiles 9, 10 and 11 are configured as hollow sections the exterior of which terminating at the bottom side of the substantially two-dimensionally extensive element 8. As shown in FIG. 1, the two-dimensionally extensive element 8 used for the formation of the members 9, 10 and 11 exhibits a multi-shell construction. Its basic form is determined by a mounting plate 12 exhibiting outer flanges 13, which extend upwardly in a transverse direction at the sides thereof. Longitudinal shell members 14 are welded into the lateral gussets formed accordingly, serving as closing panels for the formation of the longitudinal members 9. For the formation of the transverse members 10 and 11 a U-shaped transverse shell member 15 is in each case welded to the mounting plate 12, thus producing a closed profile. Appropriate flanges at the sides and at the ends of the transverse shell members 15 facilitate the welding thereof to the mounting plate 12 and the longitudinal members 9.

Alternatively, the members can also be configured as tube sections with cross sections as desired, in particular as sections produced by interior pressure shaping (hydroforming) or roll forming processes. In this case, the mounting plate is attached to the members from below.

Furthermore, it is possible to produce only part of the members or profiles in the shell construction described above and to use tube sections for further members. Moreover, open profile shapes can also be used instead of hollow sections.

The underride protection device 2 is mounted through the use of coupling elements. In the embodiment of FIG. 1, first coupling elements 31 serve as a flexible connection between the sub-frame or cross member 3 and portions of the two-dimensionally extensive element 8 which are located at an inner side of the vehicle. Second coupling elements 32 serve as a rigid connection between the longitudinal chassis beams 1 and portions of the two-dimensionally extensive element 8 which are located towards an outer side of the vehicle. In this fashion, a robust connection to the longitudinal chassis beams 1 is achieved, and moreover, a rocking or pivoting of the underride protection device can be avoided. Preferably the first coupling elements are 31 configured as releasable connections so that, in the case of minor damage, the underride protection device 2 can be replaced easily.

As shown in FIG. 1, the first coupling elements 31 include rubber flexible bearings 16 which are here connected to the front cross member 3 but can also be provided at the longitudinal chassis beams 1 or at the body of the vehicle. Each bearing 16 holds an offset bracket 17, which is configured as a torsion bar. This bracket is mounted to the two-dimensionally extensive element 8. If the longitudinal members 9 are configured as tube sections, they can form an integrated construction in connection with the bracket 17. The rotational axis of the rubber flexible bearings 16 and of the bracket 17 extends substantially in a lengthwise direction of the vehicle.

The bearings 16 are mounted on the front cross member 3 preferably in the region of the attachment of the webs 4 so that they can be provided in a production run or type series when an underride protection device is required for the respective vehicle. It is also possible, however, to integrate the outer bushings of the bearings 16 as a single piece into the front cross member 3.

The second coupling elements 32 also shown in FIG. 1 are configured as substantially vertically extending front plates 18 bridging the gap between the longitudinal chassis beams 1 and the two-dimensionally extensive element 8. The front plates 18 are preferably attached to the front ends of the longitudinal chassis beams 1 and of the longitudinal members 9. When suitable tube sections are employed, the front plates 18 can also be integrated into the longitudinal members 9, which are in this case bent up at their front ends and flattened if necessary.

Additional tie ribbons or tie rods 19 arranged between the two-dimensionally extensive element 8 and the longitudinal chassis beams 1 provide further stabilization of the support of the underride protection device 2 in order to counter a deflection of the underride protection device 2 in the case of a collision.

Figure 2:
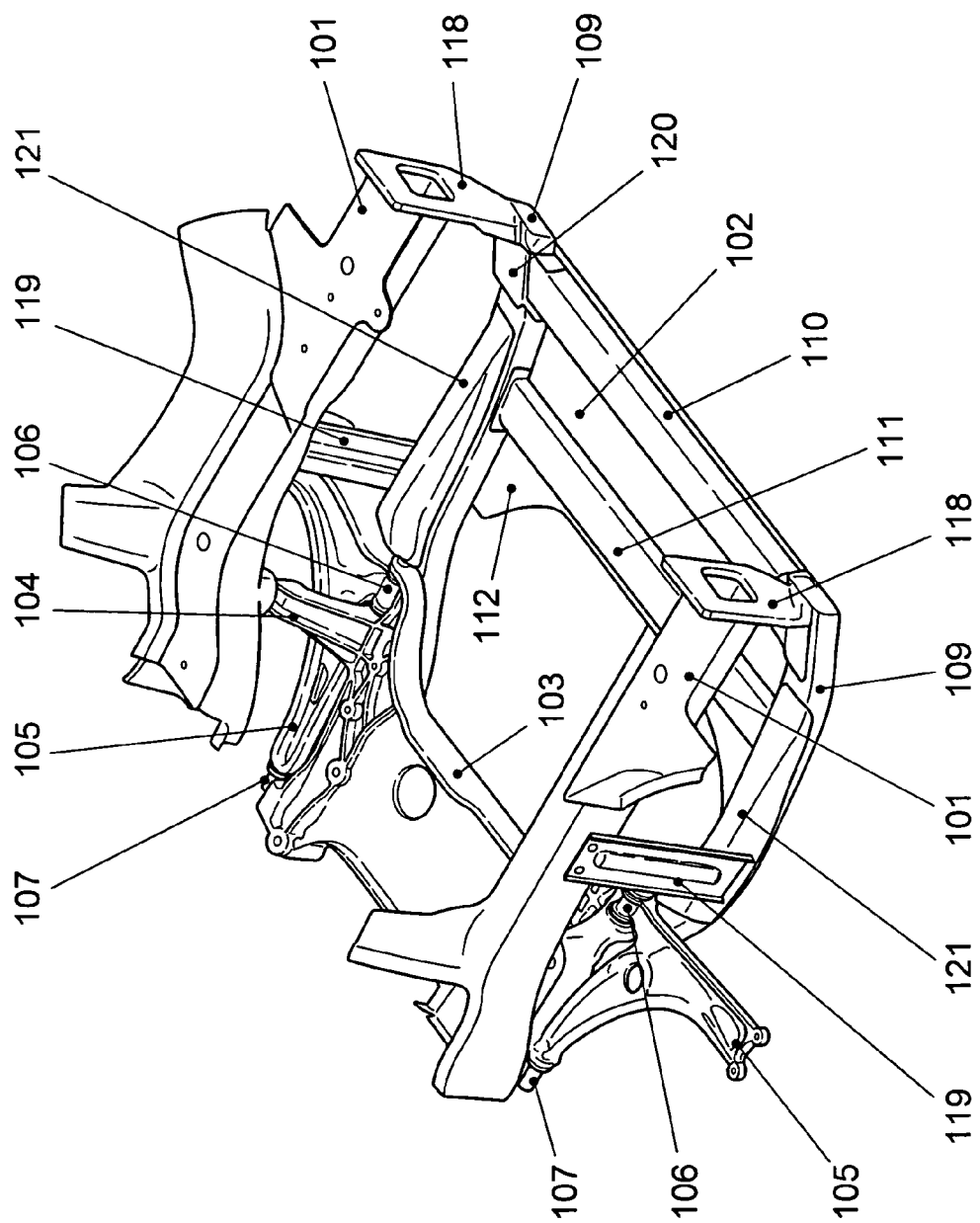
FIG. 2 is a perspective view of a second embodiment of a mounted underride protection device according to the invention.
Figure 3:
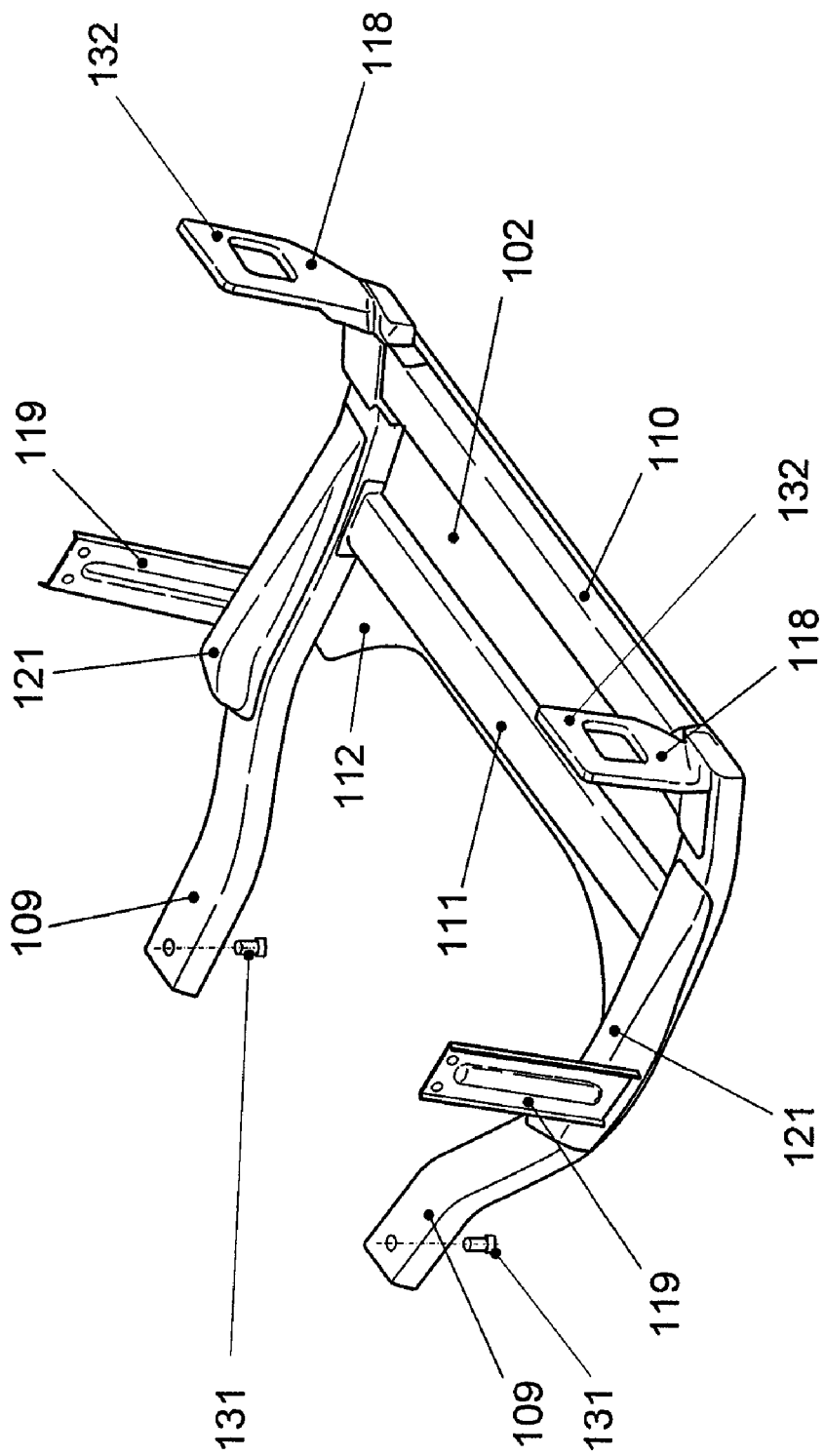
FIG. 3 is a perspective view of the underride protection device shown in FIG. 2.

A second embodiment of an underride protection device is shown in FIGS. 2 and 3. It differs from the first embodiment in the construction of the two-dimensionally extensive element and in the fastening of this element to a sub-frame or cross member.

FIG. 2 shows the assembled device in a front end of an all-terrain passenger vehicle with longitudinal chassis beams 101 arranged at a high level. The longitudinal chassis beams 101 define a first crash plane. A second crash plane is formed by an underride protection device 102 below the longitudinal chassis beams and in front of a sub-frame or front cross member 103. The front cross member 103 is mounted both to the body of the vehicle and through the use of webs 104 to the bottom sides of the longitudinal chassis beams 101. Furthermore, two wheel-locating transverse suspension arms 105 are supported by the cross member 103. They can pivot in a lengthwise direction of the vehicle, and they are connected to the front cross member 103 through the use of a bearing bushing 106 and to the body of the vehicle through the use of a bearing pin 107.

The underride protection device 102 according to the second embodiment shown in FIG. 3 again is configured as a substantially two-dimensionally extensive element 108 delimiting the engine compartment of the vehicle towards the ground. In this case, the two-dimensionally extensive element 108 is formed by a section frame exhibiting two lateral longitudinal members 109 and two transverse members 110 and 111. While the rear transverse member 111 is directly connected to the longitudinal members 109, the front transverse member 110 is connected to the front end portions of the longitudinal members 109 through the use of special connector members or gusset members 120. Where appropriate, these can be combined to form a unit with the front plates 118, which are described in detail below.

The lateral longitudinal members 109 extend substantially below the front portions of the longitudinal chassis beams 101, starting from the front end of the vehicle, bending inwards in the region of the transverse suspension arm 105 and under the front cross member 103 where they are fastened from below in a releasable connection.

The members 109, 110 and 111 in the second embodiment are configured as tube sections with an exemplified rectangular cross section. From below a substantially flat mounting plate 112 is attached to them, delimiting the two-dimensionally extensive element 108 towards the ground and forming a plane and enclosed outer wall to serve as an underride protection device.

Instead of the tube sections shown, which have a closed profile, such as sections produced by interior pressure shaping or roll forming processes, open profile shapes can also be used for the construction of a section frame. Moreover, the constructions can be combined with the configuration of the two-dimensionally extensive element shown in the first embodiment.

The underride protection device 102 is attached to the longitudinal chassis beams 101 through the use of a fixed connection both at its end towards the vehicle inside end and at its end towards the vehicle outside. As mentioned above, this fixed connection is a releasable connection at least at the end toward the interior of the vehicle. Here, screws or similar fasteners serve as first coupling elements 131. At the end toward the exterior of the vehicle, front plates 118 are provided as second coupling elements 132. The front end plates 118 extend substantially vertically and interconnect the ends of the longitudinal chassis beams 101 and those of the longitudinal members 109.

Furthermore, in the second embodiment impact elements or deflectors 121 are provided on the longitudinal members 109. Each deflector is located in front of a transverse suspension arm 105 in a lengthwise direction of the vehicle. In the second embodiment shown here, the deflectors 121 are configured as sheet metal shells, which are each welded to a longitudinal member 109. The deflectors 121 each form an elevation which, in the case of a deformation of the underride protection device caused by a crash, abut against the respective transverse suspension arm 105 located behind it. In this fashion the deformation capacity of the transverse suspension arms 105 is exploited for the purpose of absorbing crash energy. Moreover, the area of support of the underride protection device 102 in the case of a crash is broadened.

The positioning of the deflectors 121 in the region in front of the transverse suspension arm bearings 106 at the front cross member 103, which are in turn arranged in front of the webs 104, can moreover ensure a transmission of force to the front cross member 103 in the case of a breakaway of the coupling elements which provide a connection to the front cross member 103. Furthermore, the deflectors 121 prevent a deflection or "diving" of the substantially two-dimensionally extensive element 108 before its deformation. In this regard, tie rods 119 can moreover be provided between the two-dimensionally extensive element 108 and the longitudinal chassis beams 101 in order to stabilize the support of the underride protection device 102 and prevent it from deflecting.

The embodiments described above provide an underride protection device for passenger vehicles with an integrated crash beam which in vehicles with longitudinal chassis beams arranged at a high level makes a compatibility of the impact zones for protecting the occupants of a struck vehicle possible.

However, this invention is not limited to the embodiments described but rather includes all configurations defined in the claims of the invention.

This application claims the priority, under 35 U.S.C. § 119, of German patent application No. 10 2004 028 161.0, filed Jun. 9, 2004; the entire disclosure of the prior application is herewith incorporated by reference.

I claim:

1. In combination with a passenger vehicle having longitudinal chassis beams defining a vehicle longitudinal direction and having a support structure selected from the group consisting of a sub-frame and a cross member, an underride protection device, comprising:
   a substantially two-dimensionally extensive element delimiting the passenger vehicle towards a bottom side of the passenger vehicle, said substantially two-dimensionally extensive element having inner portions and outer portions, said inner portions being disposed closer to the support structure than said outer portions;
   a transverse member extending in a vehicle transverse direction;
   two lateral members extending in the vehicle longitudinal direction;
   said transverse member, said two lateral members, and said substantially two-dimensionally extensive element being disposed below the longitudinal chassis beams in front of the support structure such that said transverse member, said two lateral members, and said substantially two-dimensionally extensive element define a crash plane below the longitudinal chassis beams;
   first coupling elements connecting said inner portions of said substantially two-dimensionally extensive element to the support structure; and
   second coupling elements fixedly connecting said outer portions of said substantially two-dimensionally extensive element to the longitudinal chassis beams.

2. The underride protection device according to claim 1, wherein said substantially two-dimensionally extensive element is a shell construction.

3. The underride protection device according to claim 1, wherein said substantially two-dimensionally extensive element has a mounting plate connecting said transverse member and said two lateral members to one another.

4. The underride protection device according to claim 3, wherein said transverse member and said two lateral members are shell elements placed on an interior side of said mounting plate.

5. The underride protection device according to claim 1, wherein:
   at least one member selected from the group consisting of said transverse member and said longitudinal members is a hydroformed member; and
   said substantially two-dimensionally extensive element has a mounting plate attached to a bottom side of said transverse member and said longitudinal members.

6. The underride protection device according to claim 1, wherein:
   at least one member selected from the group consisting of said transverse member and said longitudinal members is a roll-formed member; and
   said substantially two-dimensionally extensive element has a mounting plate attached to a bottom side of said transverse member and said longitudinal members.

7. The underride protection device according to claim 1, wherein said first coupling elements are configured to flexibly connect said inner portions of said substantially two-dimensionally extensive element to the support structure.

8. The underride protection device according to claim 1, wherein said first coupling elements include rubber flexible bearings.

9. The underride protection device according to claim 8, wherein:
   said first coupling elements further include brackets provided at said substantially two-dimensionally extensive element; and
   said brackets are respectively supported by said rubber flexible bearings at said support structure.

10. The underride protection device according to claim 1, wherein said first coupling elements include brackets mounted to said substantially two-dimensionally extensive element.

11. The underride protection device according to claim 1, wherein said first coupling elements include brackets provided at said substantially two-dimensionally extensive element and said brackets are flexibly supported on said support structure.

12. The underride protection device according to claim 8, wherein said rubber-flexible bearings define respective rotational axes extending substantially parallel to the vehicle longitudinal direction.

13. The underride protection device according to claim 1, wherein said second coupling elements include front plates extending substantially vertically and bridging a spacing distance between the longitudinal chassis beams and said substantially two-dimensionally extensive element.

14. The underride protection device according to claim 1, wherein:
   transverse suspension arms are connected to the support structure; and
   deflectors are placed on said two lateral members such that said deflectors are provided, with respect to the vehicle longitudinal direction, in front of the transverse suspension arms.

15. The underride protection device according to claim 1, wherein said substantially two-dimensionally extensive element is rigidly connected to the support structure.

16. The underride protection device according to claim 1, wherein said substantially two-dimensionally extensive element, said transverse member, said lateral members, said first coupling elements, and said second coupling elements are configured to be mounted in an all-terrain passenger vehicle.

17. A passenger vehicle, comprising:
   longitudinal chassis beams extending in a vehicle longitudinal direction and defining a first crash plane;
   a support structure selected from the group consisting of a sub-frame and a cross member;
   an underride protection device disposed below said longitudinal chassis beams in front of said support structure;
   said underride protection device including a substantially two-dimensionally extensive element, a transverse member, two lateral members, first coupling elements, and second coupling elements;
   said substantially two-dimensionally extensive element delimiting the passenger vehicle towards a bottom side of the passenger vehicle, said substantially two-dimensionally extensive element having inner portions and outer portions, said inner portions being disposed closer to said support structure than said outer portions;

said first coupling elements connecting said inner portions of said substantially two-dimensionally extensive element to said support structure;

said second coupling elements fixedly connecting said outer portions of said substantially two-dimensionally extensive element to said longitudinal chassis beams;

said lateral members extending in the vehicle longitudinal direction, said transverse member extending in a vehicle transverse direction; and said transverse member, said two lateral members, and said substantially two-dimensionally extensive element defining a second crash plane below said longitudinal chassis beams.

\* \* \* \* \*